United States Patent

[11] 3,561,583

[72] Inventor Giordano Tomelleri
 22 Via Montorio, Verona, Italy
[21] Appl. No. 821,849
[22] Filed May 5, 1969
[45] Patented Feb. 9, 1971
[32] Priority May 6, 1968
[33] Italy
[31] 61246-A/68

[54] APPARATUS FOR ORIENTATING FRUIT PRODUCTS FOR PROCESSING
7 Claims, 12 Drawing Figs.

[52] U.S. Cl. ............................................. 198/33, 146/17
[51] Int. Cl. ....................................................... B65g 47/24
[50] Field of Search ............................................. 198/33(R1); 146/17.1(Inquired)

[56] References Cited
UNITED STATES PATENTS
3,282,396 11/1966 Tomelleri .................... 198/33(R1)

*Primary Examiner*—Edward A. Sroka
*Attorney*—Oberlin, Maky, Donnelly and Renner

ABSTRACT: The invention relates to apparatus for mechanically orientating fruit products of ovoid form carried in cavities provided in a conveyor, the base of each cavity having an orifice in which the fruit seats when correctly orientated, a plate provided above the conveyor supporting rotatable positioning members and adapted to be vertically displaced so as to bring said members into contact with the products and to retract said members when correct orientation is achieved, each of said members comprising a cylindrical member having a radially extending flange which serves to support it on the plate and having a frustoconical or conoidal hollow opening extending towards the product, means being provided below the conveyor belt to cause the products to be shaken continuously whilst they are being orientated.

PATENTED FEB 9 1971

APPARATUS FOR ORIENTATING FRUIT PRODUCTS FOR PROCESSING

This invention relates to apparatus for orientating fruit products of ovoid form, such as olives and the like, contained in appropriate supports, to an ideal position enabling them to be processed, for example stoned, skinned and the like.

An object of the invention is to position the products rapidly and in a manner such that their major axes coincide with the median vertical axis of a hollow or cavity in which they are lodged.

According to the present invention there is provided apparatus for mechanically orientating fruit products of ovoid form, comprising an intermittently movable conveyor provided with cavities in which the fruit is placed, the base of each cavity containing an orifice in the form of a circular hole, and having a cylindrical lateral wall terminating at the bottom in a part-spherical portion or in an inverted frustoconical portion, at least one plate provided above said conveyor and adapted to be vertically displaced to bring positioning elements into contact with the products to be orientated and to retract them therefrom when correct orientation is achieved; means for rotating the positioning elements, each positioning element comprising a cylindrical member having a radially extending flange which serves to support the cylindrical member on the above-mentioned plate, and having a frustoconical or conoidal hollow part extending towards the product to be orientated; and means provided below the conveyor belt to cause the products to be shaken continuously while they are being orientated.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 3:
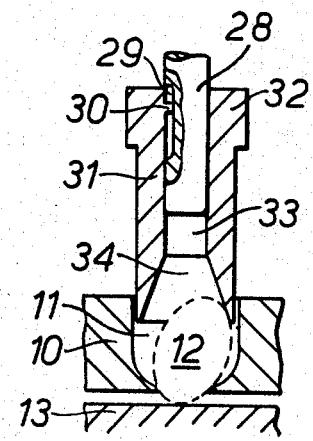
Figure 4:
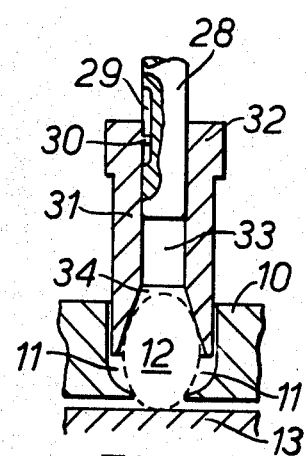
Figure 5:
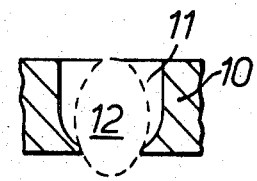
Figure 6:
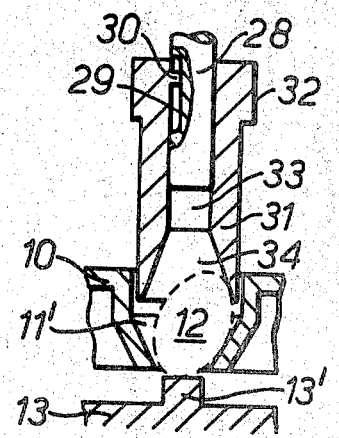
Figure 7:
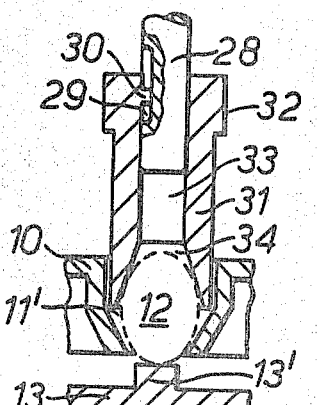
Figure 8:
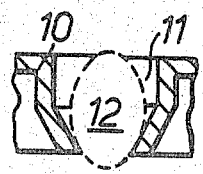
Figure 9:
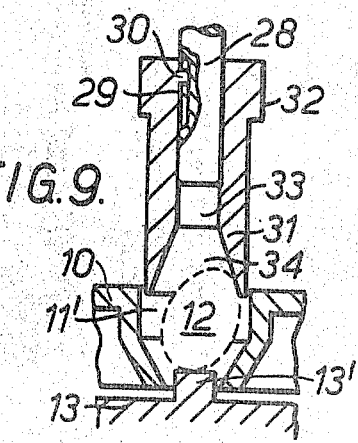
Figure 10:
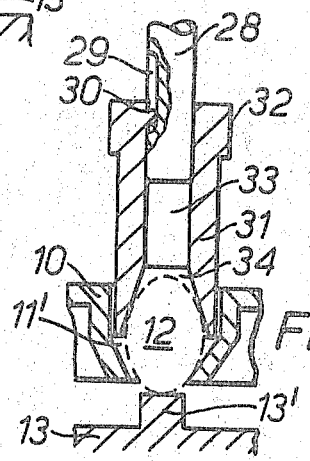
Figure 11:
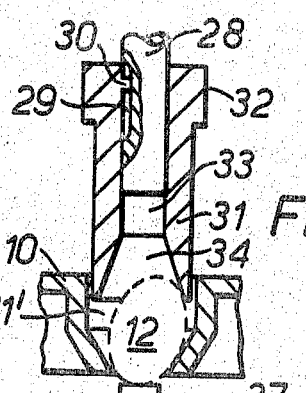
Figure 12:
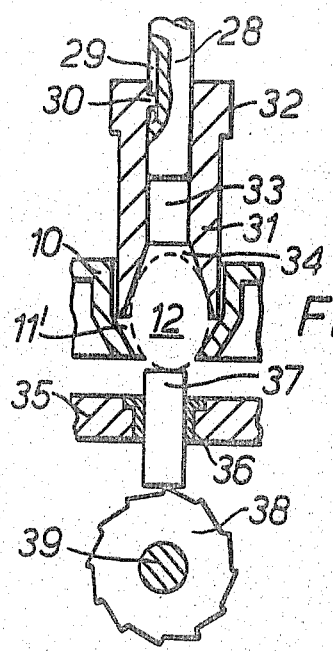

FIGS. 3 and 4 each show a section taken along the axis of a cavity for containing the product, on a larger scale than in the previous FIGS., and illustrating two typical positions of the products during the positioning phase;

FIG. 5 shows a section through a cavity with the product suitably positioned for processing;

FIGS. 6 and 7 are similar sections to those of FIGS. 3 and 4, and show a modified embodiment of the invention, wherein the cavities, having cylindrical sidewalls, terminate at the bottom in a frustoconical wall;

FIG. 8 is a section similar to that of FIG. 5 and relating to the cavity as in FIGS. 6 and 7;

FIGS. 9 and 10 show sections similar to those of FIGS. 6 and 7 and illustrate a second modified embodiment of the invention;

FIGS. 11 and 12 show sections similar to those of FIGS. 6 and 7 and illustrate a third embodiment of the invention.

Figure 1:
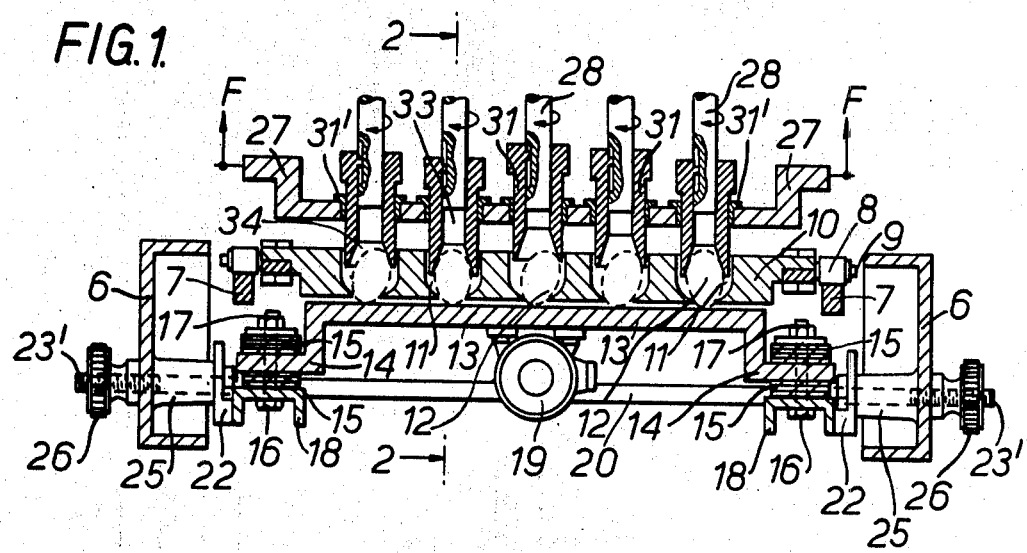
FIG. 1 is a vertical median section along the axis of the cavities for accommodating the products to be positioned, which cavities are formed in parts of an endless conveyor belt mounted between the sides of the machine.

In the drawings, like reference numerals relate to like or equivalent parts. It will be seen in FIG. 1 that, between the sides 6 of the machine, there are supported by means of a mobile frame, not illustrated, two rails 7, which, during the periods in which the conveyor belt moves forward, are raised by said mobile frame.

Running on the rails 7 are rollers 8, fitted on spindles 9, which between them loosely connect the panels 10, constituting the conveyor belt, which panels 10 contain cavities 11, each having a cylindrical lateral wall terminating at the bottom in a part-spherical wall portion, part of the base of which contains an orifice for accommodating olives 12, which, due to their ovoid form, project through the orifice provided in the base of each of the cavities 11.

During intervals in the forward movement of the conveyor belt, the olives 12, which are positioned coaxially with the element of a positioning means, rest on a table 13 having two extensions 14, each of which is connected, by way of bolts 17 and nuts 16, to a frame having support arms 18, the extensions 14 resting on resilient cushions 15, made for example of rubber. The cushions 15 enable an electric vibrator 19, secured to the table 13, to convert the latter into a vibratory table which continuously shakes the olives 12 resting thereon.

Figure 2:
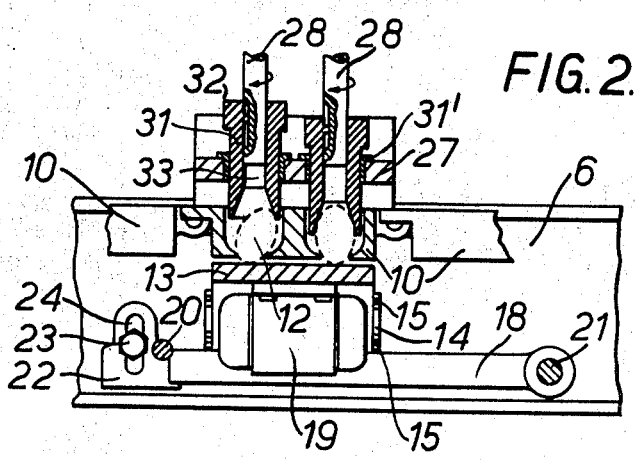
FIG. 2 is a vertical section taken on the line 2–2 indicated on FIG. 1.

As seen particularly from FIG. 2, the arms 18 are connected to the sides 6 by way of pivots 21 in such manner as to enable said arms 18 to be angularly displaced about said pivots 21.

Near their movable ends, the arms 18 are connected by a distance-bar 20, and each of the arms 18 is provided with a bracket 22 containing a slot 24 the length of which limits the angular movements of the arms 18 about the pivots 21 and enables the arms 18 to be fixed in a suitable position by means of a setscrew carrying a knob 26. This setscrew is comprised of a rod 23 passing through the slot 24 and screwed into a nut 25 of the distance-sleeve type, which is caused to rotate by means of the knob 26 and by way of the connecting spindle 23' extending through the side 6.

Accordingly, the vibrating table 13 can be positioned at varying distances from the lower part of each of the plates 10, depending upon the types of olives, which, according to their varying characteristics, project in different ways through the apertured bases of the cavities 11 in which they are accommodated.

The other elements of the positioning means that operate in combination with the vibrating table 13 are supported by a plate 27 (see FIG. 1), which moves along uprights, not illustrated, firmly connected to the sides of the machine, so as to bring nearer or retract the elements of the positioning means intended to enter the upper zone of the hollows in which the olives 12 are lodged.

Provided in holes in the plate 27 coaxial with the cavities 11, are bushes 31' for loosely supporting, by means of flanges 32, cylindrical elements 31 having bores 33 and having, at their lower ends, a downwardly directed frustoconical portion 34.

The elements 31, are caused to rotate about their median longitudinal axes by means of lugs 30 extending into slots 29 provided in the shafts 28.

Positioning of the olives 12 takes place in the following manner:

When the olives 12 are brought by the conveyor belt into vertical alignment with the elements 31 of the positioning means, upon the rails 7 being lowered, the olives 12 bear upon the vibrating table 12 which causes them to be shaken continuously. The plate 27 is lowered until the lower ends of the cylindrical elements 31 enter the cavities 11. Since the cylindrical elements 31 are loosely supported in the bushes 31', when their ends 34 move into contact with incorrectly positioned olives 12, their entry into the cavities 11 is discontinued—see FIGS. 1 and 3. However, due to the continuous shaking of the olives 12 and to the rotary movement and weight of the cylindrical elements 31, the frustoconical portions 34 very quickly come to bear upon the upper part of the olives 12 and, by successive movements, cause them to assume a position—see FIG. 3, in which their axis is vertical.

It will be noted that when the olives 12 are positioned as in FIG. 4 they do not rest on the edges of the lower apertures in the vacuities 11 but when the rails 7 lift the conveyor belt 10 so that the olives 12 are no longer affected by the movements of the vibrating table 13, the olives 12 are pushed by the weight of the cylindrical elements 31 which bear thereon while executing a rotary movement, and the olives 12 enter the lower apertures in the cavities 11 to assume a stable position. When the plate 27 moves in the direction indicated by the arrow F the ends 34 of the cylindrical elements 31 are withdrawn from the cavities 11, the olives 12, perfectly positioned, remain seated in the orifices in the bases of the cavities 11, as seen in FIG. 5.

Only then does the conveyor belt begin to move forward to bring the correctly positioned olives 12 into line with the stoning equipment, at the same time bringing a fresh row of olives 12 into lines with the positioning means.

It will be understood that, although not illustrated in the drawings, once the olives 12 are correctly positioned, it is possible to fit them into the apertures at the base of the cavities 11 by simply lowering the vibrating table 13.

Although not illustrated in the drawings, it is clear that the frustoconical hollow parts 34 can be made conoidal, concave and slightly convex, without thereby changing the essential characteristics of this invention.

Referring to FIGS. 6 to 12, it will be seen that the cavities 11' for accommodating the olives 12 have been slightly modified. These are in fact cylindrical at their upper part and frustoconical at their lower part, so as to prevent the edge of the hole in the base of the cavity damaging the olives 12. As can be seen in FIG. 8, when correctly positioned, the olives 12 are supported by the frustoconical wall and not exclusively by the edge of the hole, as in the case of the previous FIGS.

Referring to FIGS. 6 and 7, it will be seen that the vibrating table 13 is provided with bosses 13' which register with the holes in the cavities 11'. These bosses 13' can have flat, concave or convex upper ends, and they apply to the olives 12 the same action as the vibrating table 13 illustrated in the previous FIGS.

In the variant shown in FIG. 9, it will be seen that the boss 13' can directly enter the cavities 11' for accommodating the olives 12, whereas FIG. 10 illustrates the seating of the correctly positioned olive 12 between the frustoconical walls of the cavity by simply lowering the vibrating table 13.

Referring to FIGS. 11 and 12, it will be seen that the vibrating table 13 is replaced by a fixed plate 35 incorporating bushes 36 in which are mounted small push rods 37 which are caused to reciprocate by a sawtooth formation provided on a wheel 38 which is continuously rotated by a shaft 39. It is clear that the push rods 37 have the same function as the bosses 13' and, during their reciprocating movement can remain outside the cavities 11', or they can enter them.

Other modes of applying the principle of the invention may be employed, change being made as regards the details described, provided the features stated in any of the following claims, or the equivalent of such, be employed.

I claim:

1. Apparatus for mechanically orientating fruit products of ovoid form, comprising an intermittently movable conveyor, cavities provided in said conveyor in which the fruit is placed, each cavity having a cylindrical lateral wall terminating at the bottom in a base portion, an orifice in each base portion, at least one plate provided above said conveyor, positioning elements carried on said plate, said plate being adapted to be vertically displaced to bring said positioning elements into contact with the products to be orientated and to retract them therefrom when correct orientation is achieved; means for rotating the positioning elements, each positioning element comprising a cylindrical member having a radially extending flange which serves to support the cylindrical member on the above mentioned plate, each cylindrical member having a frustoconical or hollow part extending towards the product to be orientated; and means provided below the conveyor belt to cause the products to be shaken continuously while they are being orientated.

2. Apparatus as claimed in claim 1, in which the means for causing the products to be shaken while they are being orientated comprises a plate, a frame movable towards and away from the lower surface of the cavities by angular displacement of the frame, resilient means mounting said plate on said frame, and an electric vibrator mounted on the under side of said plate.

3. Apparatus as claimed in claim 1, in which the means for causing the products to be shaken whilst they are being orientated comprises a plate located below the conveyor, a plurality of upstanding cylindrical members on the upper surface of said plate adapted to register with the base portions of said cavities, a frame movable towards and away from the base portions of said cavities by angular displacement of the frame, resilient means mounting said plate on said frame, and an electric vibrator mounted on the underside of said plate.

4. Apparatus as claimed in claim 1, in which the means for rotating the positioning elements comprises a rotatable shaft for each positioning element, a recess in said shaft, a lug provided on the positioning element extending into said recess.

5. Apparatus as claimed in claim 1 in which the hollow part of each cylindrical member has a sidewall of convex conoidal form.

6. Apparatus as claimed in claim 1 in which the hollow part of each cylindrical member has a sidewall of concave conoidal form.

7. Apparatus as claimed in claim 1 in which the means for causing the products to be shaken whilst they are being orientated comprises a plate located below the conveyor, a plurality of push rods mounted in said plate, each push rod being coaxial with a cavity of said conveyor, a plurality of rotatable shafts, a wheel having a sawtooth profile for causing reciprocating movement of each rod mounted on each shaft.